(12) United States Patent
Kugimoto et al.

(10) Patent No.: US 11,656,486 B2
(45) Date of Patent: May 23, 2023

(54) OPTICAL WAVEGUIDE DEVICE

(71) Applicant: Sumitomo Osaka Cement Co., Ltd., Tokyo (JP)

(72) Inventors: Yuki Kugimoto, Tokyo (JP); Yumi Murata, Tokyo (JP); Katsutoshi Kondo, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 17/129,576

(22) Filed: Dec. 21, 2020

(65) Prior Publication Data

US 2021/0199996 A1 Jul. 1, 2021

(30) Foreign Application Priority Data

Dec. 26, 2019 (JP) .............................. JP2019-236815

(51) Int. Cl.
*G02F 1/035* (2006.01)
*G02F 1/225* (2006.01)

(52) U.S. Cl.
CPC .............. *G02F 1/035* (2013.01); *G02F 1/225* (2013.01); *G02F 2203/21* (2013.01)

(58) Field of Classification Search
CPC ...... G02F 1/035; G02F 1/225; G02F 2203/21; G02B 2006/12142
USPC ........................................................ 385/1–3
See application file for complete search history.

(56) References Cited

U.S. PATENT DOCUMENTS

| 2003/0010275 | A1* | 1/2003 | Radojevic | ............... | C30B 31/22 |
| | | | | | 117/2 |
| 2004/0264832 | A1 | 12/2004 | Kondo et al. | | |
| 2008/0069499 | A1 | 3/2008 | Tanaka | | |
| 2010/0035052 | A1 | 2/2010 | Farah | | |

(Continued)

FOREIGN PATENT DOCUMENTS

| DE | 102017000406 A1 | 7/2018 |
| EP | 1657588 A1 | 5/2006 |

(Continued)

OTHER PUBLICATIONS

"Low Loss and Low Vpi Thin Film Lithium Niobate on Quartz Electro-optic Modulators" by Stenger et al, European Conference on Optical Communication, IEEE (Year: 2017).*

(Continued)

*Primary Examiner* — Robert Tavlykaev
(74) *Attorney, Agent, or Firm* — IpHorgan Ltd.

(57) ABSTRACT

An optical waveguide device including an optical waveguide substrate that has an electro-optic effect, is a crystal having anisotropy in thermal expansion rate, has a thickness set to 10 μm or lower, and includes an optical waveguide and a holding substrate that holds the optical waveguide substrate, the optical waveguide substrate and the holding substrate being joined to each other, in which the holding substrate is formed of a crystal having a lower dielectric constant than the optical waveguide substrate and having anisotropy in thermal expansion rate, and the optical waveguide substrate and the holding substrate are joined to each other such that differences in thermal expansion rate between the optical waveguide substrate and the holding substrate become small in different axial directions on a joint surface.

2 Claims, 1 Drawing Sheet

(56) References Cited

U.S. PATENT DOCUMENTS

2014/0050440 A1    2/2014  Ichioka et al.
2020/0127634 A1    4/2020  Kurimoto

FOREIGN PATENT DOCUMENTS

| JP | 2004-045666 A | 2/2004 |
| JP | 2004-145261 A | 5/2004 |
| JP | 2008-070648 A | 3/2008 |
| JP | 4375597       | 12/2009 |
| JP | 4961372       | 6/2012 |
| JP | 5262186       | 8/2013 |
| JP | 5691808       | 4/2015 |
| JP | 2019-004308 A | 1/2019 |

OTHER PUBLICATIONS

"Full spectrum millimeter-wave modulation in thin-film LiNbO3" by Mercante et al, IEEE Research and Applications of Photonics in Defense Conference (RAPID), IEEE (Year: 2018).*

"The Temperature Coefficients of Acoustic Surface Wave Velocity and Delay on Lithium Niobate, Lithium Tantalate, Quartz, and Tellurium Dioxide" by Slobodnik, Physical Sciences Research Papers, No. 477 (Year: 1972).*

Nana Zhang, et al., Growth and Thermal Properties of Mg-Doped Lithium Isolope Niobate (mg:7LiNb03) Crystal, by Crystals, Swiss, MDPI, Aug. 3, 2018, vol. 8, No. 8, p. 1-p. 10.

* cited by examiner

OPTICAL WAVEGUIDE DEVICE

CROSS-REFERENCE TO RELATED APPLICATIONS

This application claims the benefit of Japanese Patent Application No. 2019-236815 filed Dec. 26, 2019, the disclosure of which is herein incorporated by reference in its entirety.

BACKGROUND OF THE INVENTION

Field of the Invention

The present invention relates to an optical waveguide device and particularly to an optical waveguide device including an optical waveguide substrate that has an electro-optic effect, is a crystal having anisotropy in thermal expansion rate, has a thickness set to 10 μm or lower, and includes an optical waveguide and a holding substrate that holds the optical waveguide substrate, the optical waveguide substrate and the holding substrate being joined to each other.

Description of Related Art

In the optical communication field and the optical measurement field, optical waveguide devices such as optical modulators in which an optical waveguide is formed on a substrate having an electro-optic effect such as lithium niobate (LN) are widely used. In order to broaden the bandwidths of optical modulators for which LN or the like is used, it becomes necessary to match the velocities between microwaves, which are electrical signals for modulation, and light waves that propagate in optical waveguides or to reduce the drive voltages for driving optical modulators. As means for solving this problem, used is a method in which an optical waveguide substrate is thinned and a layer having a lower dielectric constant than the optical waveguide substrate is disposed immediately below an optical waveguide or a modulation electrode.

In this case, due to internal stress attributed to a difference in linear expansion coefficient between the thinned optical waveguide substrate and the low-dielectric constant layer immediately below the optical waveguide substrate, peeling or cracking occurs in the thinned optical waveguide substrate or the characteristics of the optical modulator deteriorate due to a temperature drift. In order to suppress this, proposed is a method of using a material having a linear expansion coefficient similar to those of the optical waveguide substrate and the low-dielectric constant layer as an adhesive for attaching the optical waveguide substrate and the low-dielectric constant layer (refer to Japanese Patent No. 4375597), a method of using a resin substrate as a holding substrate that holds the optical waveguide substrate (refer to Japanese Patent No. 4961372 or Japanese Patent No. 5262186), or the like.

In addition, a LN crystal is a trigonal crystal and has linear expansion coefficients that differ in a direction perpendicular to the Z axis ([001] plane) and in a direction horizontal to the Z axis ([100] plane). Specifically, since the linear expansion coefficients of LN are 4 ppm/° C. in the Z-axis direction and 15 ppm/° C. in the X and Y-axis directions, in an X-cut substrate cut out horizontally with respect to the Z axis, the linear expansion coefficients are anisotropic on a surface of the substrate that serves as a joint surface.

Since ordinary adhesives and resin substrates are isotropic, it is not possible to match the linear expansion coefficients in different directions on the joint surface of the X-cut substrate. Therefore, Japanese Patent No. 5691808 proposes the use of a liquid crystal polymer having anisotropy in linear expansion coefficient as the holding substrate.

Meanwhile, in optical waveguide devices such as optical modulators having a Mach-Zehnder type optical waveguide, a so-called drift phenomenon in which a bias point deviates occurs. There are two types of drift phenomena, that is, a temperature drift phenomenon that occurs due to a temperature change and a DC drift phenomenon that occurs when a DC bias voltage is applied.

One of the causes for the temperature drift is that, in a case where there is a difference in linear expansion coefficient between an optical waveguide substrate and a material adhered to the optical waveguide substrate, thermal stress is generated between the materials due to a temperature change, the refractive index changes near an optical waveguide, and the bias point changes. On the other hand, the DC drift is presumed to be caused by the polarization/depolarization of a movable carrier or a polar group in an optical waveguide substrate and a different member in contact with the optical waveguide substrate.

In the prior art as described in Japanese Patent No. 4375597, Japanese Patent No. 4961372, Japanese Patent No. 5262186, and Japanese Patent No. 5691808, it was difficult to solve at the same time the problem of the temperature drift caused by the difference in linear expansion coefficient between the optical waveguide substrate and the low-dielectric constant layer formed immediately below the optical waveguide substrate and the problem of the DC drift caused by the movable carrier or the polar group included in the resin that is used as the low-dielectric constant layer or the adhesive.

SUMMARY OF THE INVENTION

An object to be achieved by the present invention is to solve a problem described above and to provide an optical waveguide device capable of suppressing a temperature drift phenomenon and a DC drift phenomenon at the same time.

In order to achieve the above-described object, an optical waveguide device of the present invention has technical features as described below.

(1) An optical waveguide device including an optical waveguide substrate that has an electro-optic effect, is a crystal having anisotropy in thermal expansion rate, has a thickness set to 10 μm or lower, and includes an optical waveguide and a holding substrate that holds the optical waveguide substrate, the optical waveguide substrate and the holding substrate being joined to each other, in which the holding substrate is formed of a crystal having a lower dielectric constant than the optical waveguide substrate and having anisotropy in thermal expansion rate, and the optical waveguide substrate and the holding substrate are joined to each other such that differences in thermal expansion rate between the optical waveguide substrate and the holding substrate become small in different axial directions on a joint surface.

(2) In the optical waveguide device according to (1), the differences in thermal expansion rate may be set to become 5 ppm/° C. or lower in anisotropic axial directions.

(3) In the optical waveguide device according to (1) or (2), the optical waveguide substrate may be formed of lithium niobate or lithium tantalate, and the holding substrate may be formed of an α-quartz single crystal.

(4) In the optical waveguide device according to any one of (1) to (3), the optical waveguide substrate and the holding substrate may be joined to each other either directly or through an adhesive layer having a thickness of 100 nm or lower.

According to the present invention, in an optical waveguide device including an optical waveguide substrate that has an electro-optic effect, is a crystal having anisotropy in thermal expansion rate, has a thickness set to 10 µm or lower, and includes an optical waveguide and a holding substrate that holds the optical waveguide substrate, the optical waveguide substrate and the holding substrate being joined to each other, since the holding substrate is formed of a crystal having a lower dielectric constant than the optical waveguide substrate and having anisotropy in thermal expansion rate, and the optical waveguide substrate and the holding substrate are joined to each other such that the differences in thermal expansion rate between the optical waveguide substrate and the holding substrate become small in different axial directions on a joint surface, it becomes possible to provide an optical waveguide device capable of suppressing the temperature drift phenomenon and the DC drift phenomenon at the same time.

DETAILED DESCRIPTION OF THE INVENTION

Hereinafter, the present invention will be described in detail using preferred examples.

Figure 1:
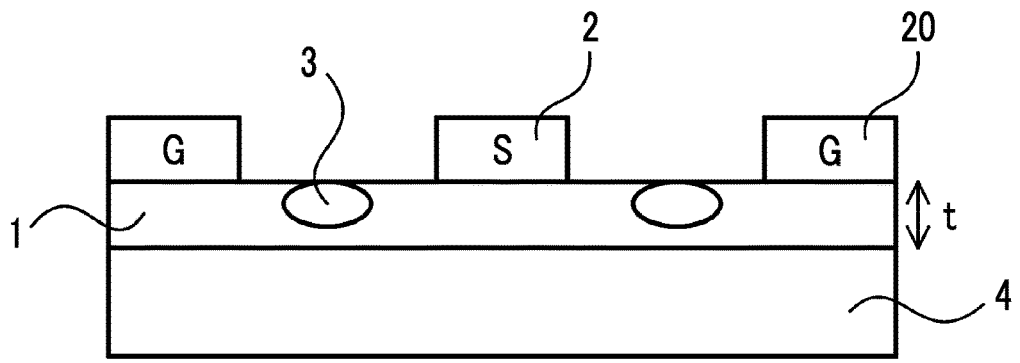
FIG. 1 is a cross-sectional view showing a first example of an optical waveguide device according to the present invention.
Figure 2:
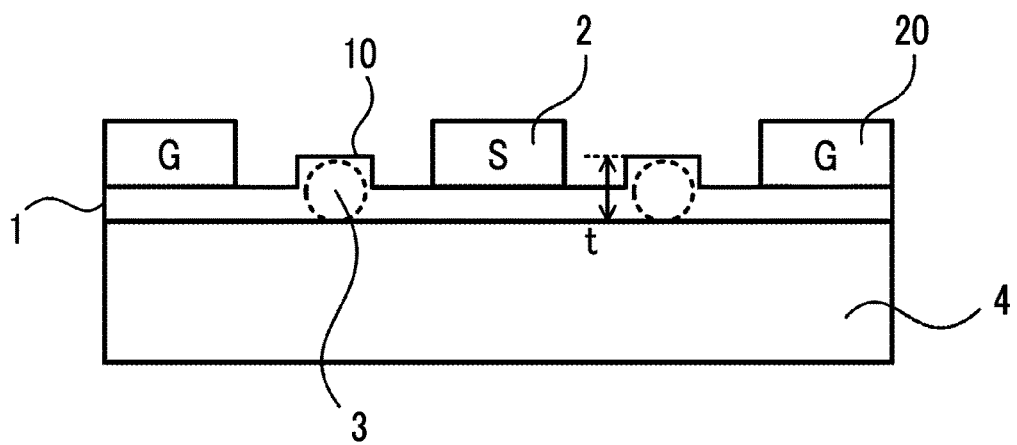
FIG. 2 is a cross-sectional view showing a second example of the optical waveguide device according to the present invention.
Figure 3:
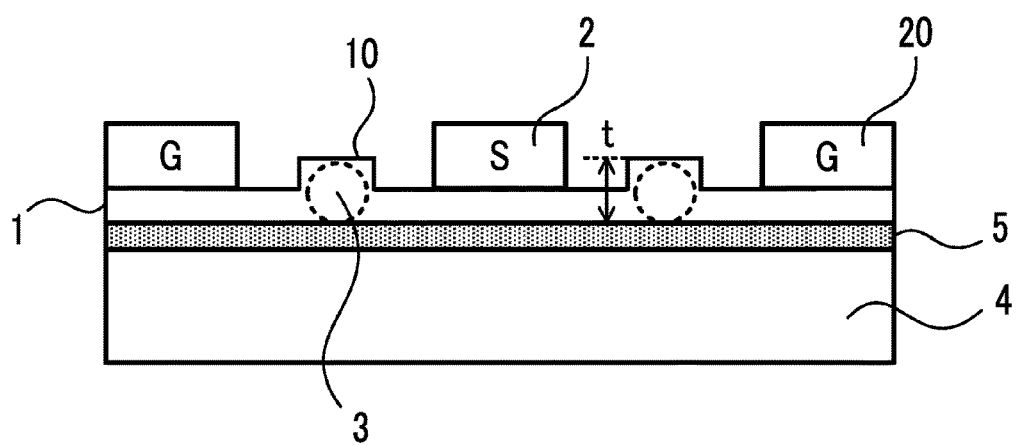
FIG. 3 is a cross-sectional view showing a third example of the optical waveguide device according to the present invention.

The present invention is an optical waveguide device including, as shown in FIGS. 1 to 3, an optical waveguide substrate 1 that has an electro-optic effect, is a crystal having anisotropy in thermal expansion rate, has a thickness t set to 10 µm or lower, and includes optical waveguides 3 and a holding substrate 4 that holds the optical waveguide substrate, the optical waveguide substrate 1 and the holding substrate 4 being joined to each other, in which the holding substrate 4 is formed of a crystal having a lower dielectric constant than the optical waveguide substrate 1 and having anisotropy in thermal expansion rate, and the optical waveguide substrate and the holding substrate are joined to each other such that differences in thermal expansion rate between the optical waveguide substrate and the holding substrate become small in different axial directions on a joint surface.

The optical waveguide substrate 1 that is used in the present invention is a crystal of lithium niobate (LN) or lithium tantalate (LT) and is a trigonal crystal. The thickness t of the optical waveguide substrate is 10 µm or lower from the viewpoint of the velocity matching between microwaves and light waves, the reduction of the drive voltage, or the like. The thickness t is set to 2 µm or lower in a case where the waveguides are formed in a ridge structure (ridge portions 10) as shown in FIG. 2 or 3 in order to strengthen light confinement and more preferably set to lower than 1 µm in order to decrease the bend radius of the waveguide.

In a thin plate such as the optical waveguide substrate having a thickness t of 10 µm or lower, a toughness is impaired, and the plate becomes extremely brittle. Therefore, in the case of a ridge waveguide, stress concentrates in an edge portion, and, physically, a crack is more likely to be generated. According to the present invention, since the generation of internal stress attributed to thermal expansion is suppressed, it is possible to reduce cracks.

As a method for forming the optical waveguides 3, it is possible to apply a method in which metal such as Ti is thermally diffused in the substrate to form portions having a higher refractive index than the substrate material as shown in FIG. 1, a method in which protrusions and recesses are formed on the surface of the substrate to configure ridge-type waveguides (rib waveguides) 10 as shown in FIG. 2 or 3, or the like. In addition, control electrodes such as modulation electrodes that apply an electric field to the optical waveguides (a signal electrode (S) 2 and ground electrodes (G) 20) or DC bias electrodes are formed by laminating gold on a base electrode layer such as Au/Ti formed on the substrate by a plating method or the like in a thickness of several to several tens of micrometers.

As the holding substrate 4 that holds the optical waveguide substrate 1, a crystal having a lower dielectric constant than the optical waveguide substrate and having anisotropy in thermal expansion rate is used. Specifically, a trigonal crystal such as an α-quartz single crystal is preferably used. The α-quartz single crystal has a relative dielectric constant of 4.6, which is sufficiently low compared with even LN (relative dielectric constant: 29.5) or LT (relative dielectric constant: 44.5), which is a single crystal substrate having the electro-optic effect.

In addition, the α-quartz single crystal is a trigonal crystal and is different from amorphous (the linear expansion coefficient is isotropic) quartz glass. The linear expansion coefficients of the α-quartz single crystal are 8 ppm/° C. in the Z-axis direction and 13 ppm/° C. in the X and Y-axis directions, and the α-quartz single crystal has anisotropy in linear expansion coefficient. Furthermore, these linear expansion coefficients have values close to the linear expansion coefficients of LN (4 ppm/° C. in the Z-axis direction and 15 ppm/° C. in the X and Y-axis directions) or the linear expansion coefficients of LT (5 ppm/° C. in the Z-axis direction and 14 ppm/° C. in the X and Y-axis directions).

Therefore, when the optical waveguide substrate and the holding substrate are joined to each other such that the Z axis of the optical waveguide substrate and the Z axis of the α-quartz single crystal, which is the holding substrate (low-dielectric constant layer), become parallel to each other, it is possible to bring the linear expansion coefficient of the low-dielectric constant layer close to the linear expansion coefficient of the optical waveguide substrate. As a result, it is possible to effectively suppress a temperature drift attributed to thermal stress between the optical waveguide substrate and the low-dielectric constant layer.

Furthermore, the amount of an impurity contained in the α-quartz single crystal is small, and it also becomes possible to suppress the occurrence of the DC drift phenomenon caused by a movable carrier. From this point as well, artificial crystal (low-temperature type α-quartz) capable of further reducing the amount of an impurity in the crystal is more preferable.

In addition, regarding the joining between the optical waveguide substrate and the holding substrate, in the case of using the α-quartz single crystal, the linear expansion coefficients of the optical waveguide substrate and the holding substrate are extremely close to 5 ppm/° C. or lower, and the substrates do not break even after undergoing a heating step where the substrates are heated to near 600° C., and thus direct joining in which the substrates are covalently bonded to each other also becomes possible. Particularly, even in the case of performing annealing by a thermal treatment in order to suppress scattering on the side surface of the ridge-type waveguide or in the case of performing a baking treatment on a resist material, it becomes possible to suppress the breakage of the substrates.

The optical waveguide substrate 1 and the holding substrate 4 may be directly joined to each other using a method such as the activation of the surfaces of both substrates as shown in FIG. 1 or 2 or may be joined to each other through an adhesive layer 5 as shown in FIG. 3.

The use of an adhesive, a resin, water glass, glass frit, or the like as the adhesive layer 5 becomes a cause for the occurrence of the temperature drift phenomenon attributed to a difference in linear expansion coefficient between the adhesive layer and the optical waveguide substrate. In addition, due to the influence of a polar group, a movable carrier, or the like that is contained in the adhesive layer, the use of the above-described material also becomes a cause for the occurrence of the DC drift phenomenon, which is not preferable. These drifts are more likely to be caused particularly as the thickness of the adhesive layer increases.

In the case of using the adhesive layer 5 for the joining of the substrates, it is preferable to form an oxide such as alumina, tantalum pentoxide, or niobium pentoxide or the like extremely thin (100 nm or lower) from the viewpoint of suppressing the occurrence of the temperature drift phenomenon or the DC drift phenomenon as much as possible.

crystals for holding substrates, and the influences of the drift phenomena were evaluated. The results are shown in Table 1. It should be noted that, in Table 1, "X-LN" for the optical waveguide substrates indicates X-cut LN substrates. In addition, the notation also applies to an LT substrate in the same manner. "CTE" indicates linear expansion coefficients, and "horizontal" and "perpendicular" indicate linear expansion coefficients in different axial directions on the joint surfaces of the substrates. "None" for adhesives means direct joining, and "$Al_2O_3$ 10 nmt" means that the substrates are joined to each other by applying $Al_2O_3$ (alumina) in a thickness of 10 nm. "Acrylic" and "glass frit" are the materials of the adhesives, and the numerical values indicate their thicknesses. "X-α-quartz" for the holding substrates are an X-cut α-quartz single crystal.

Modulators having a Mach-Zehnder type (MZ structure) optical waveguide were produced, and the drifts were evaluated. In the evaluation of the temperature drift, the temperature was changed from −5° C. to 85° C. in a state where an AC voltage was applied to the modulator, and the amount of a change in the peak intensity of light output from the modulator was measured as a voltage value.

On the other hand, in the evaluation of the DC drift, the measurement temperature was set to 85° C., the applied voltage was set to be constant (3.5 V), and the amount of a change in the peak intensity of light output from the modulator in 24 hours was measured as a voltage value.

In Table 1, these amounts of voltage changes were regarded as drift amounts, cases where the drift amount was 3 V or lower were evaluated as "O", and cases where the drift amount was larger than 3 V were evaluated as "X".

TABLE 1

| | Optical waveguide substrate | | Adhesive | Holding substrate | | Drift amount | |
|---|---|---|---|---|---|---|---|
| | Material | CTE (ppm/° C.) | Material | Material | CTE (ppm/° C.) | Temperature | DC |
| Example 1 | X-LN | Horizontal: 15 Perpendicular: 4 | None | X-α-quartz | Horizontal: 13 Perpendicular: 8 | O | O |
| Example 2 | X-LT | Horizontal: 14 Perpendicular: 5 | None | X-α-quartz | Horizontal: 13 Perpendicular: 8 | O | O |
| Example 3 | X-LN | Horizontal: 15 Perpendicular: 4 | Al2O3 10 nmt | X-α-quartz | Horizontal: 13 Perpendicular: 8 | O | O |
| Comparative Example 1 | X-LN | Horizontal: 15 Perpendicular: 4 | None | Quartz glass | Horizontal: 0.5 Perpendicular: 0.5 | X | O |
| Comparative Example 2 | X-LN | Horizontal: 15 Perpendicular: 4 | Acrylic 10 μmt | X-α-quartz | Horizontal: 13 Perpendicular: 8 | X | X |
| Comparative Example 3 | X-LN | Horizontal: 15 Perpendicular: 4 | Glass frit 10 μmt | X-α-quartz | Horizontal: 13 Perpendicular: 8 | X | X |
| Comparative Example 4 | X-LN | Horizontal: 15 Perpendicular: 4 | None | Z-α-quartz | Horizontal: 13 Perpendicular: 13 | X | O |

Evaluation of drift amount: O indicates '≤3 V', X indicates '>3 V'.

In the optical waveguide device, in order to realize a stable operating environment and suppress deterioration over time, the substrates (chips) that configure the optical waveguide device are stored in a chassis made of metal or the like. In the case of using stainless steel (linear expansion coefficient: 10 ppm/° C.) or a cobalt alloy such as KOVAR (registered trademark of Carpenter Technology Corporation, linear expansion coefficient: 5 ppm/° C.) for the chassis, the material has a linear expansion coefficient close to the linear expansion coefficient of the holding substrate, and it becomes possible to provide an optical waveguide device that is highly durable against a temperature change.

Optical waveguide devices were produced using LN or LT for optical waveguide substrates and using α-quartz single From the results in Table 1, it was confirmed that, in a case where the α-quartz single crystal is used for the holding substrate and the differences in linear expansion coefficient are suppressed to 5 ppm/° C. or lower in different axial directions on the joint surface with the optical waveguide substrate, it is possible to effectively suppress not only the temperature drift phenomenon but also the DC drift phenomenon.

As described above, according to the optical waveguide device according to the present invention, it becomes possible to provide an optical waveguide device capable of suppressing the temperature drift phenomenon and the DC drift phenomenon at the same time.

We claim:

1. An optical modulator comprising:
   an optical waveguide substrate that has an electro-optic effect, is a crystal having anisotropy in a thermal expansion rate, has a thickness set to 10 μm or lower, and includes an optical waveguide; and
   a holding substrate that holds the optical waveguide substrate, the optical waveguide substrate and the holding substrate being directly bonded to each other,
   wherein the holding substrate is formed of a crystal having a lower dielectric constant than the optical waveguide substrate and having anisotropy in a thermal expansion rate, and
   the optical waveguide substrate and the holding substrate are joined to each other such that differences in the thermal expansion rates between the optical waveguide substrate and the holding substrate are set to become 5 ppm/° C. or lower in both anisotropic axial directions on a joint surface.

2. The optical modulator according to claim 1, wherein the optical waveguide substrate is formed of lithium niobate or lithium tantalate, and the holding substrate is formed of an α-quartz single crystal.

* * * * *